C. G. OLSON.
TOOL DRESSING DEVICE.
APPLICATION FILED MAR. 20, 1919.
1,357,814.
Patented Nov. 2, 1920.
2 SHEETS—SHEET 1.
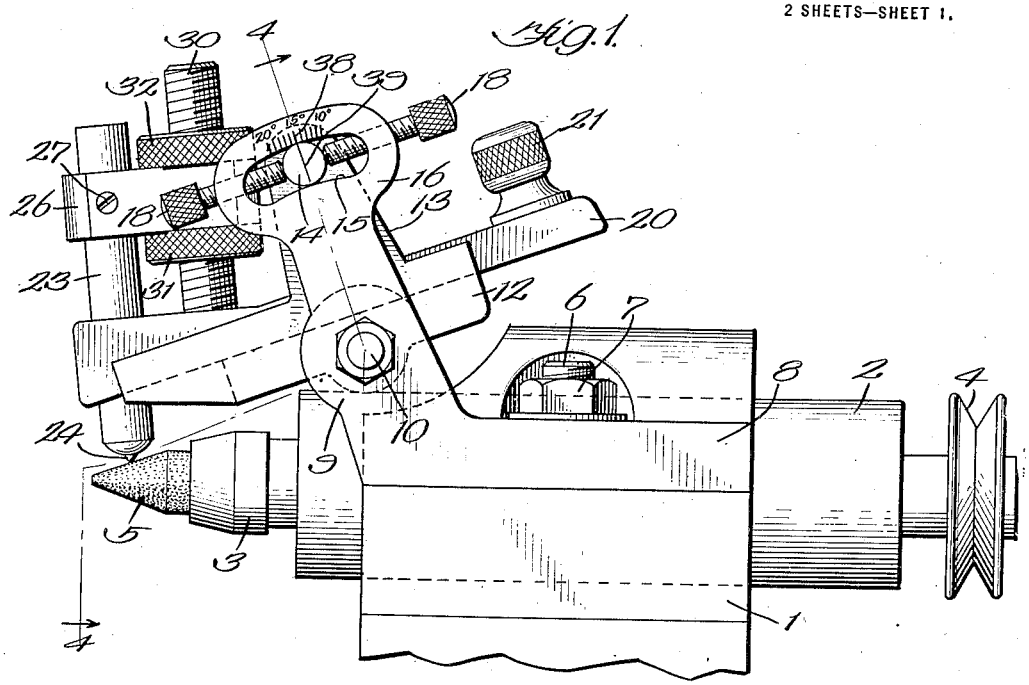
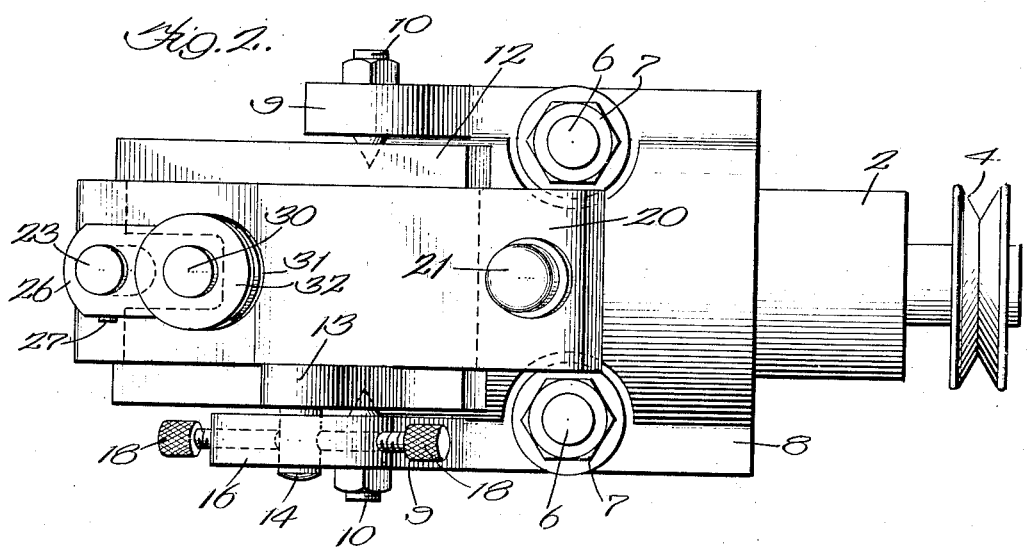
Inventor:
Carl G. Olson.
By Cheever & Cox
Attys.

C. G. OLSON.
TOOL DRESSING DEVICE.
APPLICATION FILED MAR. 20, 1919.
1,357,814.
Patented Nov. 2, 1920.
2 SHEETS—SHEET 2.
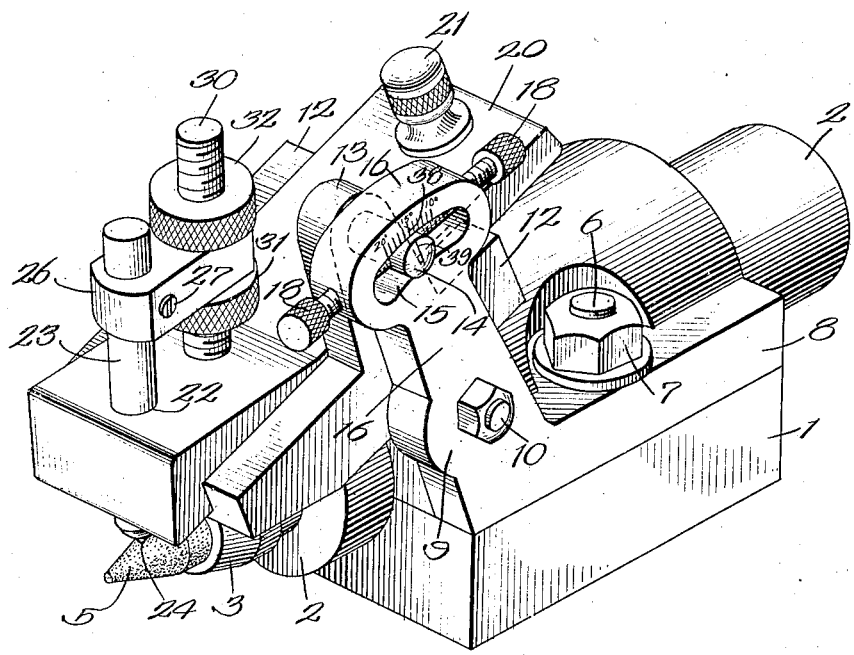
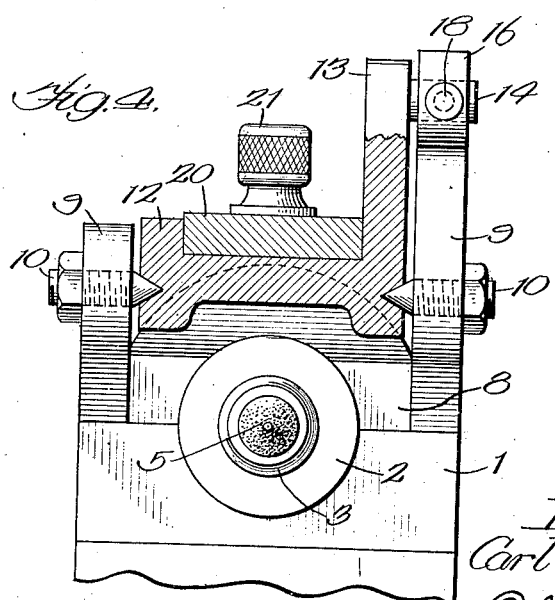
Inventor:
Carl G. Olson.
By Cheever & Cox
Attys

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

TOOL-DRESSING DEVICE.

1,357,814.   Specification of Letters Patent.   Patented Nov. 2, 1920.

Application filed March 20, 1919. Serial No. 283,733.

*To all whom it may concern:*

Be it known that I, CARL G. OLSON, a citizen of the United States, residing at Chicago, in the county of Cook and State of Illinois, have invented a certain new and useful Improvement in Tool-Dressing Devices, of which the following is a specification.

My invention relates to tool dressing devices and in the form illustrated constitutes an attachment which may be applied to grinding machines such, for example, as illustrated in my prior Patent No. 1,232,715, issued July 10, 1917. It is important that the grinding tool, which in the present case is shown in the form of a so called "grinding point," should be kept accurately trued or dressed, and the general object of my invention is to provide an attachment which may be readily applied to or removed from a grinding machine for the purpose of dressing the grinding tool. Another and more specific object of the invention is to provide means for changing the obliquity or tilt of the guide which carries the tool holder or slide, the purpose being to vary at will the angle of the surface to be formed on the dressing tool. Another object is to provide simple and convenient means by which the dressing tool may be adjusted in the slide.

I obtain my objects by the mechanism illustrated in the accompanying drawings, in which Figure 1 is a side view of my device shown in position upon a grinding machine.

Figs. 2 and 3 are plan and perspective views, respectively of the parts shown in Fig. 1.

Fig. 4 is a section taken on the irregular line 4—4, Fig. 1.

Like numerals denote like parts throughout the several views.

In the form shown, the grinding machine of which my present device forms an attachment, has a block 1 which supports the housing 2 in which the spindle 3 is journaled. While the type of spindle and spindle housing may be varied, and are immaterial for the present purposes, a suitable construction is shown in detail in my prior Patent No. 1,232,714, issued July 10, 1917. The spindle is driven at high speed by means of a sheave 4 or other suitable power device, and is adapted to hold the grinding tool, such for example as the grinding point 5.

Referring to the parts more intimately connected with my present invention, a frame 8 is fastened by bolts 6 and nuts 7 to block 1, and serves to clamp the housing 2 in position in it. This frame has two ears 9, 9 which carry two horizontally arranged center points 10, 10 which form pivot bearings for a guide 12 which is arranged between them. The construction is shown in section in Fig. 4. At one side said guide has an up-standing arm 13 which carries an outward projecting pin 14 which extends into a slot 15 formed in the up-standing arm 16 of the supporting frame 8. By preference the arm 16 is simply an upward extension of one of the ears 9. Pin 14 lies between the opposing ends of two set screws 18, 18 mounted on arm 16, and by properly manipulating them the guide may be held at any desired angle of obliquity in frame 8.

Longitudinally, slidable within the guide 12 is a slide 20 provided at the rear end with a handle 21 by which it may be reciprocated in the guide. At the forward end of the slide there is an aperture 22 through which the dressing tool 23 passes. The lower end of the dressing tool has a diamond point 24 for truing the grinding point 5. The tool holder 26 is provided with a set screw 27 for holding the dressing tool in position. The tool holder may be adjusted vertically by means of the adjusting screw 30 which has two nuts 31 and 32, one below and one above the tool holder. By suitably manipulating these nuts the tool holder, and consequently the tool, may be raised or lowered away from or toward the grinding point.

In practice, when the grinding tool 5 has become out of true, the operator attaches my device to the grinding machine by clamping the supporting frame 8 in proper position as herein above described. He then brings the guide 12 to the proper angle by manipulating the set screws 18. It will be understood, of course, that this adjustment need not be made every time the attachment is used, because it will be necessary to change the angle only when a grinding point of different conical angle is to be dressed, after the guide is in place and the slide 20 is lowered to the proper elevation by manipulating the adjusting nuts 31, 32. When the adjustment has been made the operator turns on the power so as to start the spindle and grinding point to rotating. He then grasps the handle 21 and moves the slide 20 forward within the guide 12. When the dressing operation is finished the attachment may be easily removed by simply unscrewing the nuts 7 from the bolts 6.

The angular adjustment of the guide 12 in the supporting frame 8 may be easily accomplished, for in the preferred form the slotted arm 16 has a graduated scale 38 marked upon its side as shown in Fig. 1. A center line 39 is marked upon the pin 14 and the angle of tilt of the tool (and hence the taper of the grinding point) may be determined by reading the center line against the scale.

The attachment and detachment of the device to and from the grinding machine is such a simple matter that but little time and care are required for placing the attachment in operating position. Furthermore, the manipulation of the device after it is in place is also a very simple matter as it consists merely in moving the slide 20 forward or backward in the guide 12. For these reasons and the added reason that the spindle and dressing tool do not have to be removed from the grinding machine, the operator loses very little time in keeping the grinding tool in proper condition.

Attention is called to my copending application filed on even date herewith, Serial No. 283,748.

Having thus described my invention what I claim as new and desire to secure by Letters Patent, is:—

1. An attachment for grinding machines for truing the grinding tool thereof, said attachment having a supporting frame adapted to be attached to the grinding machine, a guide in the form of a rocking frame cradled in the supporting frame, a slide supported and guided by said guide, and a dressing tool carried by said slide, the supporting frame and the guide having coöperating arms facing each other, one of said arms supporting screw mechanism whereby the tilt of the guide relatively to the supporting frame may be varied.

2. An attachment for grinding machines comprising a supporting frame adapted to be held stationary, a guide in the form of a rocking frame in said supporting frame, the supporting frame and the guide having upstanding arms facing each other, said arms having a slot and pin connection and the slotted arm carrying an adjusting screw adapted to engage the pin for regulating the tilt of the guide, and a slide working in said guide and provided with a tool holder.

3. An attachment for grinding machines comprising a supporting frame adapted to be held stationary, a guide in the form of a rocking frame in said supporting frame, the supporting frame and the guide having upstanding arms facing each other, said arms having a slot and pin connection and the slotted arm carrying an adjusting screw adapted to engage the pin for regulating the tilt of the guide, a slide working said guide, and a tool holder mounted on the slide and adjustable in a direction toward and from the slide.

In witness whereof, I have hereunto subscribed my name.

CARL G. OLSON.